United States Patent

Smorada

[11] Patent Number: 5,080,960
[45] Date of Patent: Jan. 14, 1992

[54] COMPOSITE SHEET OF POLYPROPYLENE FILM AND NON-WOVEN FABRIC FOR SEPARATING STACKED GROUPS OF CONTAINERS

[75] Inventor: Ronald L. Smorada, Kennett Square, Pa.

[73] Assignee: Reemay, Inc., Old Hickory, Tenn.

[21] Appl. No.: 664,488

[22] Filed: Mar. 4, 1991

Related U.S. Application Data

[63] Continuation of Ser. No. 7,418,530, Oct. 10, 1989, abandoned.

[51] Int. Cl.⁵ .............................................. B32B 5/12
[52] U.S. Cl. .................................... 428/213; 428/192;
  428/141; 428/219; 428/284; 428/286; 428/296;
  428/340; 428/156; 428/194; 428/523; 428/516;
  108/901; 211/59.4
[58] Field of Search ............... 428/192, 141, 213, 219,
  428/284, 286, 296, 340, 156, 194, 523, 516;
  108/901; 211/59.4

[56] References Cited

U.S. PATENT DOCUMENTS

| | | | |
|---|---|---|---|
| Re. 29,192 | 4/1977 | Anderson et al. | 108/55.3 X |
| 2,120,610 | 6/1938 | Howard | 211/59.4 X |
| 2,928,200 | 3/1960 | Shiels | 211/59.4 X |
| 2,969,153 | 6/1959 | Leon | 211/59.4 |
| 3,666,604 | 11/1968 | Cottet | 428/296 X |
| 3,932,682 | 1/1976 | Loxx et al. | 428/910 X |
| 4,262,051 | 4/1981 | Welz et al. | 428/296 X |
| 4,503,114 | 3/1985 | Cohen | 428/296 X |
| 4,649,007 | 3/1987 | Bonis et al. | 428/339 X |
| 4,686,136 | 8/1987 | Homonott et al. | 428/296 X |
| 4,748,070 | 5/1988 | Beehler | 428/910 X |
| 4,834,605 | 5/1989 | Jerred | 414/791.7 |
| 4,892,769 | 1/1990 | Perdelwitz, Jr. et al. | 428/286 X |
| 4,913,957 | 4/1990 | Stack et al. | 428/286 |
| 4,961,983 | 10/1990 | Smorada et al. | 478/284 X |

FOREIGN PATENT DOCUMENTS 0085474  8/1983  European Pat. Off. ............ 428/286

Primary Examiner—Ellis P. Robinson
Assistant Examiner—William P. Watkins, III
Attorney, Agent, or Firm—Juettner Pyle & Lloyd

[57] ABSTRACT

A separator pad for stacked containers is composed of a spunbonded central fabric of polypropylene having a basis weight of 6 to 11 oz. per square yard and outer flat layers of polypropylene.

6 Claims, 1 Drawing Sheet

COMPOSITE SHEET OF POLYPROPYLENE FILM AND NON-WOVEN FABRIC FOR SEPARATING STACKED GROUPS OF CONTAINERS

This is a continuation of copending application Ser. No. 07/418,530 filed on Oct. 10, 1989 now abandoned.

BACKGROUND OF THE INVENTION

This invention relates to sheets or flat pads of material which are employed to separate adjacent stacked levels or groups of open containers during transport and prior to filling.

Many types of liquid and other products are furnished in sealed containers composed of metals such as aluminum or steel, or other materials such as glass. A particular example is in the beer industry in which thin wall aluminum cans are used. The light weight cans as furnished to the brewery are pre-painted or labeled and have open tops.

In order to package the cans or other containers for delivery to the filling operation, the empty cans are arranged in a stacked bundle on a rectangular pallet, and the bundle is secured around the perimeter for shipment. Each row or group of equal height cans is arranged in an upright configuration with their sides touching, and each group or row of containers is separated from an adjacent row by a planar rectangular sheet of material referred to as a separator sheet or pad. Successive groups of containers are loaded by sliding them onto and across a separator pad, followed by application of an additional pad. The cans are unloaded in a similar fashion.

Especially in the case of containers for food products and beverages, much effort has been devoted to finding a suitable material for a separator sheet or pad for reasons of sanitation, flavor and safety. Prior art separator sheets have been made of chipboard containing cellulose materials and a binder. These products are porous and fragile and have a limited useful life. Also, cellulose-based products may harbor insects, which may cause contamination of the open top can by virtue of its contact with the separator during packing and shipment. Finally, cellulose and other materials may contribute to off-odors or flavors in the final product in a number of ways. For example, a porous board may absorb solvents or other volatiles generated in the painting process, or the board itself may contain volatiles which contaminate the atmosphere inside the can.

Another important criterion for a reusable separator sheet is the ability of the sheet surfaces to remain free of wrinkles and creases while providing a limited degree of sliding friction during packing and handling. Creases or wrinkles in the sheet are unacceptable because the cans tend to topple over during the loading and unloading operation. At the same time, the sliding friction between the can and the sheet must be low enough to allow loading and unloading. On the other hand, if the surface of the sheets is too slippery, the containers tend to slide out between the liners or separators during transport.

In an attempt to find an acceptable substitute, homogeneous sheets of various polymers, such as polyester and polyvinyl chloride, have been proposed. Polyester sheets have been found to be unsuitable because they are not resistant to tear propagation and also build up a static electrical charge and may create a fire hazard. Vinyl polymers may contain volatile components such as plasticizers which are emitted into the can after packaging, thereby affecting or altering the flavor after filling. Also, some of these materials tend to tear easily, and are either not sufficiently stiff or tend to crack at lower temperatures.

SUMMARY OF THE INVENTION

Accordingly, an object of the present invention is to provide a separator sheet or pad which is flexible yet shape retaining, and having surfaces which are resistant to indentation, wrinkles and distortion.

Another object of the present invention is to provide a separator sheet or pad of tear-resistant and durable construction, which is cleanable and washable, and which may be handled and reused over a period of time.

A further object of the present invention is the provision of a separator sheet or pad which is non-porous and non-toxic, which does not harbor insect life, and which does not absorb or emit volatiles which would cause off-flavors or odors in the canned product.

In accordance with the present invention, the foregoing objectives are accomplished by the provision of a separator pad or sheet in composite form. The composite sheet comprises a central core or layer of high basis weight, nonwoven, spunbonded fabric, preferably of a polyolefin such as having a basis weight of from about 6 to about 11 oz. per square yard. Both sides of the spunbonded fabric are coated with a layer of a polymer, preferably polypropylene, in the form of a discreet film layer on both sides of the fabric. At least some edges of the composite are preferably sealed by partial fusion. Also, one or both of the film surfaces are finely roughened during processing to provide a matte finish on the surface.

THE DRAWINGS

DESCRIPTION OF THE PREFERRED EMBODIMENTS

Figure 1:
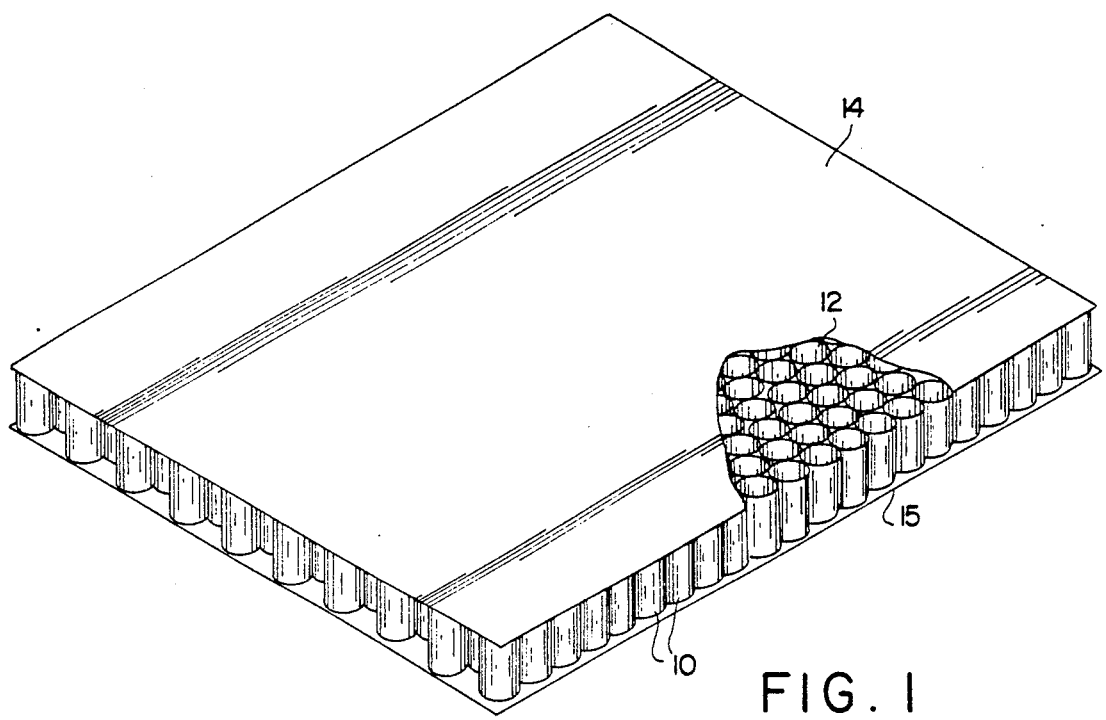
FIG. 1 is a perspective view, with a portion broken away, of a group of upright cylindrical cans with their opposite ends in contact with the spacer sheets or pads of the present invention.
Figure 2:
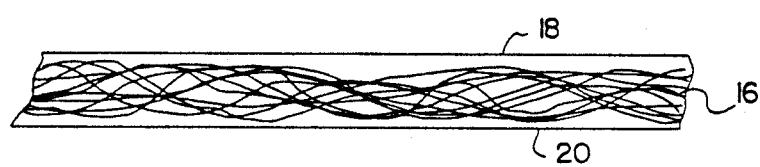
FIG. 2 is a vertical sectional view of the spacer pad or sheet of the present invention.

FIG. 2 illustrates the composite separator pad of the present invention, and FIG. 1 illustrates the use of the pad in connection with containers.

FIG. 1 illustrates a contiguous group of cylindrical, equi-height containers 10 such as aluminum cans which have open upper ends 12. The containers are disposed in a contiguous upright position between a pair of spaced separator pads 14 and 15. In actual practice, a large number of rows or levels of containers would be loaded into a stack, with adjacent levels being separated by the pads such as 14 or 15. For example, in the case of thin wall beverage cans, the rectangular spacer pads would have dimensions of 44×56 inches, and twenty layers of containers would be placed in a stack. The bundle, having a weight in the order of three hundred pounds, would be strapped around the perimeter prior to transport.

It may be visualized that, as the number of layers of cans increases, the greater the weight imposed on the lower layers. As shown, the open containers have sharp edges which tend to cut into the separator pad. It may also be seen that a separator pad completely closes the open top of the containers while they are bundled in this fashion. Thus, any solid or volatile materials present in the pad may fall or migrate into the container.

As shown in FIG. 2, the composite separator pad of the present invention comprises a central core or layer 16 of a nonwoven, spunbonded polymer fabric. The methods of making spunbonded fabrics are well known and involve the generation of a large number of continuous filaments of a polymer, with immediate deposit on a moving belt to obtain a web. The filaments are bonded to varying degrees by the use of pressure and/or heat in the continuous process. The preferred polymer used in making the central layer 16 is a polyolefin, such as polypropylene, which has a relatively low density in comparison to other spunbonded polymers, such as polyester. A suitable manufacturing process is described in U.S. Pat. No. 4,582,750. Spunbonded polypropylene fabrics are available under the trademarks "TYPAR" and "TEKTON" from Reemay, Inc.

Both sides of the central layer 16 of spunbonded fabric are provided with continuous and impermeable layers 18 and 20 of polymer in the form of a coating or film bonded to the surface fibers of the fabric. A preferred method of applying the layers is by the continuous hot extrusion of the layer directly onto the fabric, followed by passage through a nip of a pair of rotating rolls to produce a web coated on both sides. The preferred polymer for the outer layers is polypropylene. During application, the layers 18 and 20 are applied as a surface coating and penetrate only slightly through the surfaces of the fabric, as shown. Penetration of the coating completely through the fabric would immobilize the filaments of the fabric and would not result in a suitable product. The final product is in the form of a stiff and flexible sheet or laminate having outer planar flat surfaces.

At least one of the surfaces of the outer layers 18 and 20 is preferably provided with a matte of finely roughened finish. This may be accomplished during the manufacturing process by passing the coated web in contact with a roll having a slightly roughened finish. Post treatment finishing methods may also be employed.

The composite web is cut into rectangles or other shapes which are suitable for use as a separator pad. A hot knife or ultrasonic knife may be employed on at least two sides to partially fuse the edges and prevent subsequent delamination of the composite. Complete fusion at the edges is generally undesirable because a rigid bead may be formed which could break off during handling and use.

The basis weight of the central layer 16 and overall thickness of the composite are critical to a successful product. The basis weight of the spunbonded layer is from about 6 to about 11 oz. per square yard and optimumly about 7 to about 10 oz. per square yard. At basis weights below six or seven the product becomes too flimsy, and at a basis weight above eleven, the product is difficult to handle and cut.

The thickness of the outer layers is in the order of from about one to about four mils, with an overall thickness of the composite being in the order of from about 20 to about 40 mils. The high basis weight of the spunbonded fabric combined with the outer stabilized layers provide a composite of the desired stiffness, while the product is still flexible and has good recovery properties. Also, the thickness of the central core provides a limited degree of cushion or resilience to the composite, to better hold the containers in position and to minimize permanent marking or cupping of the pad surfaces by the containers.

Since the outer layers 18 and 20 of the composite are relatively inert and are impervious to gas and liquids, the separator pad of the present invention will not absorb or transmit gas or liquids, and the material itself does not contain any volatiles that could be emitted into the containers.

I claim:

1. A separator pad for use in separating vertically stacked groups of containers during packing and transport, said separator pad comprising a composite sheet consisting essentially of a nonwoven spunbonded central fabric layer and having a basis weight of from about 6 to about 11 oz. per square yard, and a flat outer layer of polypropylene bonded on both sides of said central fabric layer, said outer layer having a thickness of one to about four mils and being impervious to gas and liquids, the overall thickness of said composite being in the order of from about 20 to about 40 mils.

2. The separator pad of claim 1 in the form of a sheet having edges, and wherein at least one of said edges is sealed by partial fusion.

3. The separator pad of claim 1 wherein one of said surfaces has a matte finish.

4. The separator pad of claim 1 wherein said nonwoven spunbonded fabric is composed of polypropylene.

5. A separator pad for use in separating stacked groups of containers during packing and transport, said separator pad comprising a central core of spunbonded polypropylene fabric having a basis weight of from about six to about eleven ounces per square yard, and an outer layer of polypropylene on both sides of said fabric bonded thereto, said outer layer being impervious to gas and liquids, said pad being stiff and having an overall thickness of from about 20 to about 40 mils.

6. A stacked bundle of containers and separator pads comprising in combination a plurality of groups of containers arranged in a stacked relationship, and a separator sheet disposed between adjacent groups of said containers, said separator sheet having sufficient stiffness to support the containers and comprising a composite material consisting essentially of a central layer of spunbonded polypropylene fabric having a basis weight of from about six to about eleven ounces per square yard, and an outer continuous and gas and liquid impervious layer of polypropylene on both sides of said fabric, said composite having an overall thickness in the order of from about 20 to about 40 mils.

* * * * *